United States Patent
Takahashi et al.

(10) Patent No.: US 7,628,190 B2
(45) Date of Patent: Dec. 8, 2009

(54) PNEUMATIC TIRE AND MANUFACTURING METHOD OF THE SAME

(75) Inventors: Masanori Takahashi, Kobe (JP); Norio Hayashi, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 323 days.

(21) Appl. No.: 11/223,104

(22) Filed: Sep. 12, 2005

(65) Prior Publication Data

US 2006/0054259 A1   Mar. 16, 2006

(30) Foreign Application Priority Data

Sep. 13, 2004   (JP) ............... 2004-265744

(51) Int. Cl.
*B60C 15/06* (2006.01)
*B60C 13/00* (2006.01)
*B29D 30/30* (2006.01)
*B29D 30/72* (2006.01)

(52) U.S. Cl. ............... 152/525; 152/541; 152/543; 152/546; 152/547; 156/130.7; 156/132; 156/135

(58) Field of Classification Search ............... 152/524, 152/525, 539, 543, 547, 555; 156/117, 130, 156/132, 133, 135, 130.7
See application file for complete search history.

(56) References Cited

U.S. PATENT DOCUMENTS

| | | | | |
|---|---|---|---|---|
| 4,963,207 A | * | 10/1990 | Laurent ............... | 156/117 |
| 5,725,702 A | * | 3/1998 | Nakamura et al. ............... | 152/539 |
| 5,979,527 A | * | 11/1999 | Kobayashi et al. ............... | 152/525 |
| 6,039,826 A | * | 3/2000 | Okada ............... | 156/117 |
| 6,554,041 B1 | * | 4/2003 | Ohki et al. ............... | 156/397 |
| 6,923,879 B1 | * | 8/2005 | Blickwedel et al. ............... | 156/117 |
| 2002/0056496 A1 | * | 5/2002 | Tanaka et al. ............... | 152/524 |
| 2003/0102088 A1 | * | 6/2003 | Iiduka ............... | 156/394.1 |
| 2006/0090836 A1 | * | 5/2006 | Caretta et al. ............... | 156/117 |

FOREIGN PATENT DOCUMENTS

| | | |
|---|---|---|
| EP | 0 947 358 A1 | 10/1999 |
| EP | 1 020 284 A2 | 7/2000 |
| EP | 1 020 284 A3 | 7/2000 |
| EP | 1 201 414 A2 | 5/2002 |
| EP | 1 201 414 A3 | 5/2002 |
| EP | 1 211 057 A2 | 6/2002 |
| EP | 1 211 057 A3 | 6/2002 |
| FR | 2 023 015 A | 8/1970 |
| JP | 2000-254980 A | 9/2000 |
| JP | 2002-205512 A | 7/2002 |

* cited by examiner

*Primary Examiner*—Geoffrey L Knable
(74) *Attorney, Agent, or Firm*—Birch, Stewart, Kolasch & Birch, LLP

(57) ABSTRACT

A pneumatic tire comprises a carcass reaching a bead core of a bead portion from a tread portion via a side wall portion; a side wall rubber arranged in an outer side of said carcass and forming an outer side surface of said side wall portion; and a clinch rubber for preventing a rim displacement connected to a lower end of the side wall rubber and forming an outer side surface of said bead portion. The sidewall rubber and the clinch rubber are constituted by a strip wind body formed by winding and overlapping a side wall rubber strip and a clinch rubber strip in a circumferential direction and spirally, and the respective rubber strips are wound in the same direction from the bead portion side toward the tread portion side.

3 Claims, 7 Drawing Sheets

PNEUMATIC TIRE AND MANUFACTURING METHOD OF THE SAME

BACKGROUND OF THE INVENTION

The present invention relates to a pneumatic tire which can increase a winding working efficiency at a time of forming a side wall rubber and a clinch rubber in accordance with a strip wind method, and can inhibit a turbulence of a rubber strip, and a manufacturing method of the same.

In the pneumatic tire, a conventional step at a time of forming the side wall rubber and the clinch rubber is shown in FIGS. 7(A) to 7(D).

As shown in FIG. 7(A), in particular, a composite rubber body b comprising a side wall rubber b1 and a clinch rubber b2 which are integrally extruded from a rubber extruder is wound around a region on a former a and in both ends (FIG. 3) of a former a at one circle. Thereafter, as shown in FIG. 7(B), a carcass ply d is wound between the composite rubber bodies b and b at one circle while being bridged.

Further, as shown in FIG. 7(B), a bead core e is set on an overlapping portion between the composite rubber body b and the carcass ply d. The carcass ply d is inflated in a toroidal shape between the bead cores e and e. Prior to this, a tread ring f (including a tread rubber f1) which is separately formed so as to constitute the tread portion is awaited in an outer side in a radial direction. The carcass ply d presses the inflated portion to an inner surface of the tread ring f so as to stick thereto together with the inflation, thereby integrally connecting. Further, a portion j protruding to an outer side in an axial direction of the former from the bead core e is wound up around the bead core e, and is pressed and stuck to a side surface of the toroid-shaped carcass ply d, whereby the side wall portion is formed (FIG. 7(D)).

On the other hand, for example, Japanese Published patent application No. 2000-254980 and the like have proposed a method (a so-called strip wind method) of forming a rubber member such as a side wall rubber, a clinch rubber, a tread rubber or the like by a strip wind body formed by winding a long rubber strip so as to overlap in a circumferential direction and spirally. In this method, since a large-size rubber extruder is not required, and it is not necessary to store an extrusion molding body for the rubber member as an intermediate stock, it is possible to obtain a great advantage especially for a tire which tends to be manufactured in a large item small scale production, such as achieving space-saving, and the like.

However, in the case of forming the side wall rubber and the clinch rubber corresponding to the composite rubber body b by using the strip wind method, in the raw tire forming step mentioned above, it is necessary to sequentially wind two kinds of rubber strips having different rubber compositions, finish forming one rubber (for example, the clinch rubber), and thereafter form the other rubber (for example, the side wall rubber) so as to be connected to an end portion of the one rubber.

Accordingly, a time is required for winding, and a production efficiency is deteriorated. Further, in a step (FIGS. 7(C) and 7(D)) of winding up the protruding portion j and pressing to the side surface of the toroid-shaped carcass ply d, the cylindrical protruding portion j is deformed in a disc shape, however, an elongation in a circumferential direction is increased at this time in accordance with being apart from the bead core e in a radial direction. Accordingly, the turbulence is generated in winding the rubber strip, and there is generated a tendency that an outer appearance quality of the tire is deteriorated.

SUMMARY OF THE INVENTION

Accordingly, an object of the present invention is to provide a pneumatic tire which can simultaneously wind respective rubber strips, can shorten a winding time so as to increase a production efficiency, can inhibit a turbulence of a rubber strip at a time of winding up a protruding portion, and can improve an outer appearance quality of the tire, and a manufacturing method of the same.

The present invention is based on winding each of the rubber strips in the same direction toward a tread side from a bead side, at a time of forming a side wall rubber and a clinch rubber in accordance with a strip wind method.

DETAILED DESCRIPTION OF THE PREFERRED EMBODIMENTS

Figure 1:
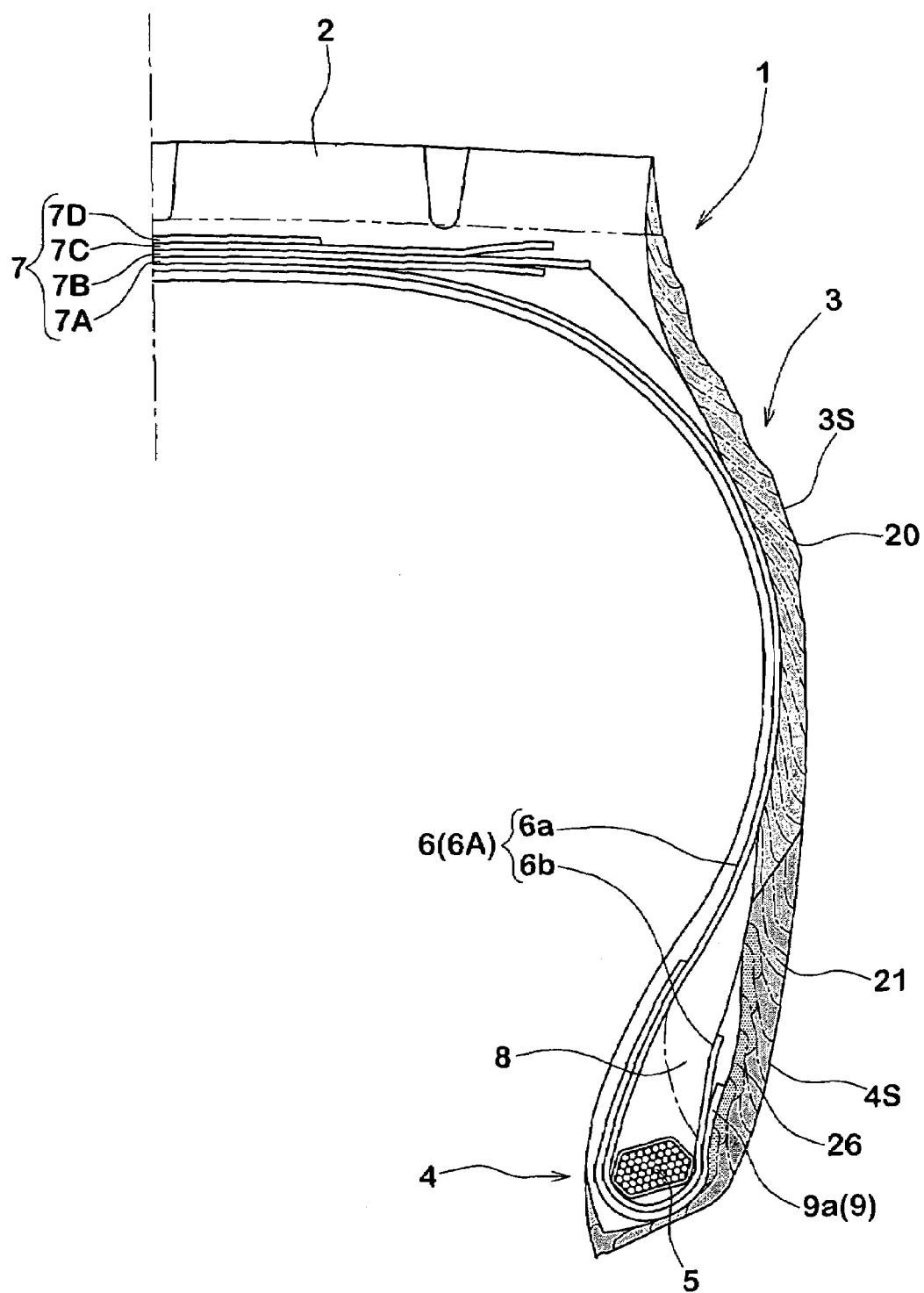
FIG. 1 is a cross sectional view showing an embodiment of a pneumatic tire in accordance with the present invention.
Figure 2:
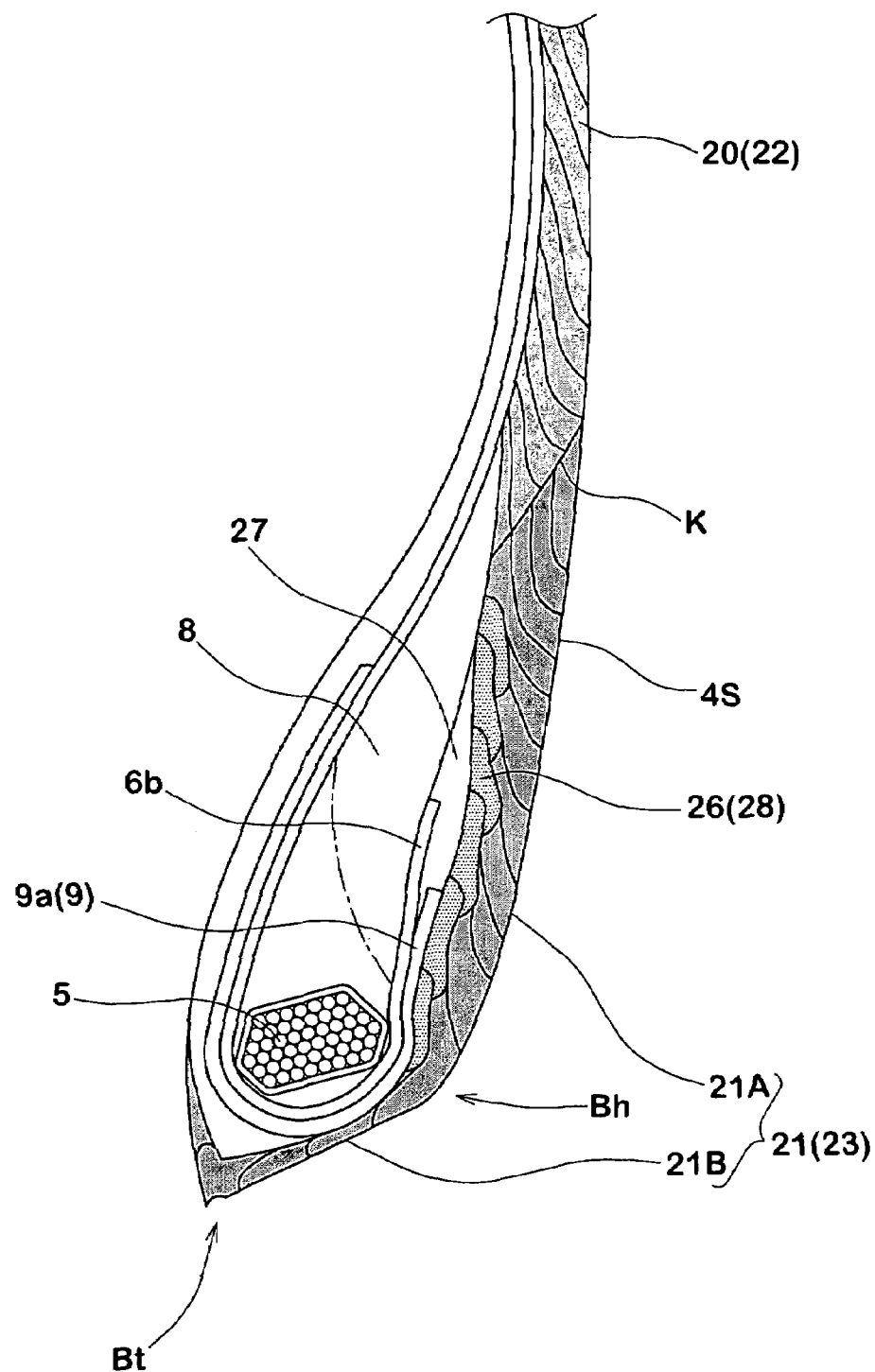
FIG. 2 is a cross sectional view showing a bead portion of the pneumatic tire in an enlarged manner.
Figure 3:
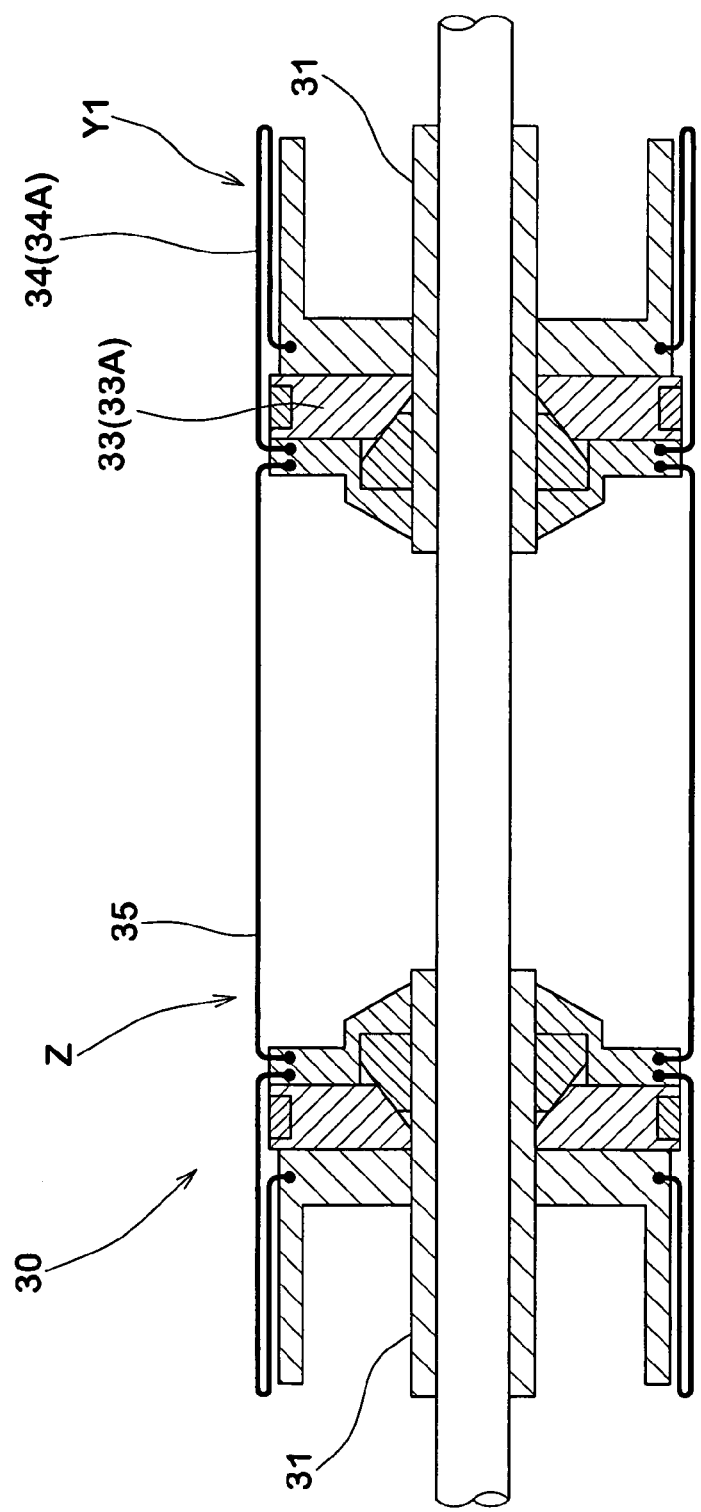
FIG. 3 is a cross sectional view showing a former in a conceptual manner.

A description will be given of an embodiment in accordance with the present invention together with an illustrated embodiment. FIG. 1 is a cross sectional view exemplifying a case that a pneumatic tire in accordance with the present invention is constituted by a tire for a heavy load, and FIG. 2 is a cross sectional view showing a bead portion thereof in an enlarged view.

In FIG. 1, a pneumatic tire 1 is provided with at least a carcass 6 reaching a bead core 5 of a bead portion 4 from a tread portion 2 via a side wall portion 3, a side wall rubber 20 arranged in an outer side of the carcass 6 and forming an outer side surface 3S of the side wall portion 3, and a clinch rubber 21 connected to a lower end of the side wall rubber 20 and forming an outer side surface 4S of the bead portion 4, for preventing damage by rim displacement.

The carcass 6 is formed by one or more, one in the present embodiment, carcass ply 6A in which carcass cords are arranged, for example, at an angle between 70 and 90 degrees with respect to a tire circumferential direction. The carcass ply 6A is provided with ply fold-back portions 6b folded back to an outer side from an inner side in a tire axial direction around the bead core 5 in series, in both sides of a ply main body portion 6a astride between the bead cores 5 and 5. Further, a bead reinforcing bead apex rubber 8 extending in a tapered shape toward an outer side in a radial direction from the bead core 5 is provided between the ply main body portion 6a and the ply fold-back portion 6b.

In this case, in the present embodiment, a bead reinforcing cord layer 9 folded back in a U shape along the carcass ply 6A is arranged in the bead portion 4. Further, the ply fold-back portion 6b is terminated in an inner side in a radial direction from a leading end of the bead apex rubber 8, and an outer side in a radial direction from a leading end of an outer piece portion 9a in a tire axial direction of the bead reinforcing cord layer 9.

Further, a belt layer 7 constituted by two or more belt plies, or normally constituted by three or four belt plies in the case of the tire for the heavy load, is arranged in an outer side in a radial direction of the carcass 6 and an inner side of the tread portion 2. In the present embodiment, the belt layer 7 is exemplified by a four-sheet structure comprising a first innermost belt ply 7A in which the belt cords are arranged, for example, at an angle between 45 and 75 degrees with respect to the tire peripheral direction, and second to fourth belt plies 7B to 7D which are piled in order upwards, and in which the belt cords are arranged, for example, at an angle between 10 and 35 degrees with respect to the tire peripheral direction. In the belt layer 7, a belt rigidity is increased by providing with one or more portion in which the belt cords intersect to each other between the plies, and the tread portion 2 is firmly reinforced with a hoop effect.

Next, the clinch rubber 21 is constituted by a rubber which is excellent in an abrasion resistance. Further, the clinch rubber 21 is structured such as to include a clinch base portion 21A forming an outer side surface 4S of the bead portion 4, and a clinch bottom portion 21B extending to a bead toe portion Bt. The clinch base portion 21A forms the outer side surface 4S of the bead portion 4 in the present embodiment, as shown in FIG. 2, and rises to a height position over an upper end of a rim flange (not shown) in a radial direction from a bead heel portion Bh.

Further, a side wall rubber 20 forming an outer side surface 3S of the side wall portion 3 is continuously provided in the clinch base portion 21A via a border line K. The sidewall rubber 20 is made of a soft rubber in which a rubber hardness is smaller than the clinch rubber 21. In the present embodiment, there is exemplified a so-called side wall over tread (SOT) structure which extends to an outer side in a radial direction from the border line K and covers an outer side surface of the tread rubber 2G terminating near the tread end.

Further, the side wall rubber 20 and the clinch rubber 21 are formed by a strip wind body obtained by winding a long rubber strip 22 for the side wall and a rubber strip 23 for the clinch in a state of overlapping in a peripheral direction and spirally.

At this time, it is important that each of the rubber strips 22 and 23 are wound in the same direction toward the tread portion 2 side from the bead portion 4 side. Accordingly, it is possible to simultaneously wind each of the rubber strips 22 and 23, and it is possible to achieve a reduction of winding time increasing a production efficiency. Further, in a raw tire forming step, it is possible to inhibit a turbulence in winding of the rubber strip 22, and it is possible to improve an outer appearance quality of the tire. The reason thereof will be described in detail in an explanation of a tire manufacturing method.

Further, in the case of forming the hard clinch rubber 21 by the strip wind body, there is a tendency that an adhesion property with the tire member arranged in an inner side in the tire axial direction is deteriorated. Accordingly, in the present embodiment, a thin soft inner clinch rubber layer 26 particularly extending so as to be adjacent to an inner side surface of the clinch rubber 21 is provided between the bead apex rubber 8 and the clinch rubber 21. Accordingly, an adhesion property between the clinch rubber 21 and the tire member thereat is improved. In the present embodiment, there is exemplified a case that the inner side tire member is constituted by a packing rubber 27 covering the outer piece portion 9a of the bead reinforcing cord layer 9, a leading end thereof and a leading end of the ply fold-back portion 6b, together with the bead apex rubber 8. The inner side tire member may be constituted by one or more of the outer piece portion 9a, the ply fold-back portion 6b and the bead apex rubber 8.

In this case, a rubber hardness $Hs2$ (a durometer A hardness) of the inner clinch rubber layer 26 is smaller than a rubber hardness $Hs1$ (a durometer A hardness) of the clinch rubber 21, and in the present embodiment, a difference ($Hs1-Hs2$) is set to 10 to 20 degrees. Further, the rubber hardness $Hs2$ is set so as to be larger than a rubber hardness $Hs3$ of the side wall rubber 20. In the case that the difference ($Hs1-Hs2$) is less than 10 degrees, it is difficult to improve the adhesion property, and if it is inversely more than 20 degrees, there is a disadvantage that a durability is deteriorated. The rubber hardness $Hs1$ of the clinch rubber is set within a range between 70 and 79 degrees in the same manner as the conventional one.

In the present embodiment, the inner clinch rubber layer 26 is also formed by the strip wind body obtained by winding the long rubber strip 28 for the inner clinch in the circumferential direction and spirally, however, the inner clinch rubber layer 26 may be formed by winding a wide band-shaped rubber body at one circle.

Figure 4:
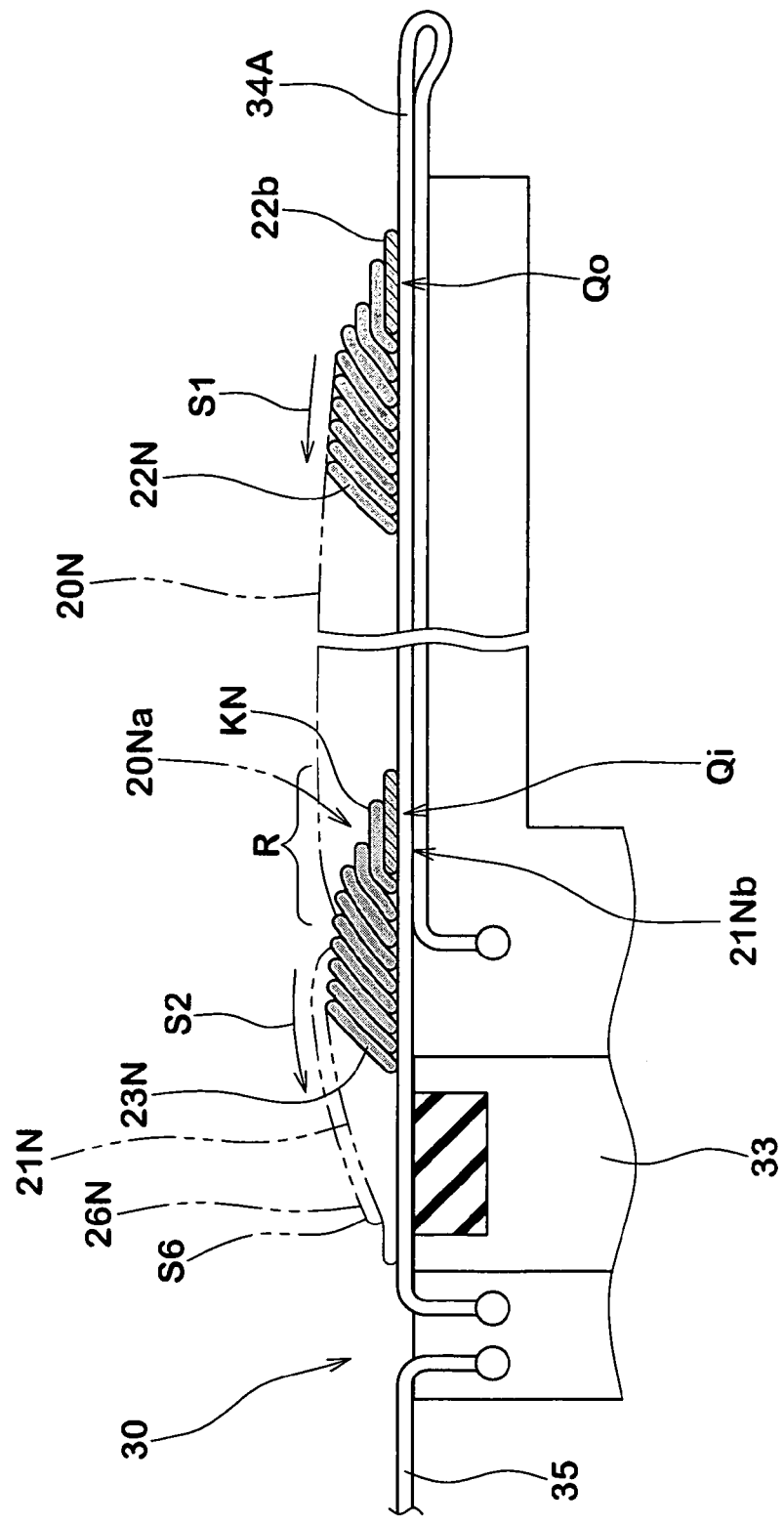
FIG. 4 is a cross sectional view explaining a raw side wall rubber forming step and a raw clinch rubber forming step.

Next, a description will be given of a manufacturing method of the pneumatic tire. In the manufacturing method, for forming the raw tire, as shown in FIG. 4, a first aspect of the present invention is to achieve the following step S1 and step S2 substantially at almost the same time:

(1) a raw side wall rubber forming step S1 of forming a raw side wall rubber 20N by overlapping and winding a raw rubber strip 22N for the side wall in the circumferential direction and spirally on the former 30; and (2) a raw clinch rubber forming step S2 of forming a raw clinch rubber 21N by overlapping and winding a raw rubber strip 23N for the clinch in the circumferential direction and spirally on the former 30.

Figure 5A:
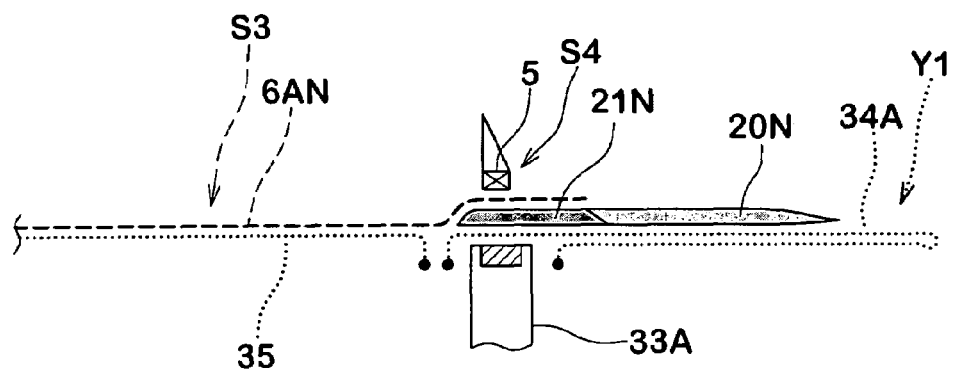
FIGS. 5(A) to 5(C) are schematically cross sectional views explaining the other steps.
Figure 5B:
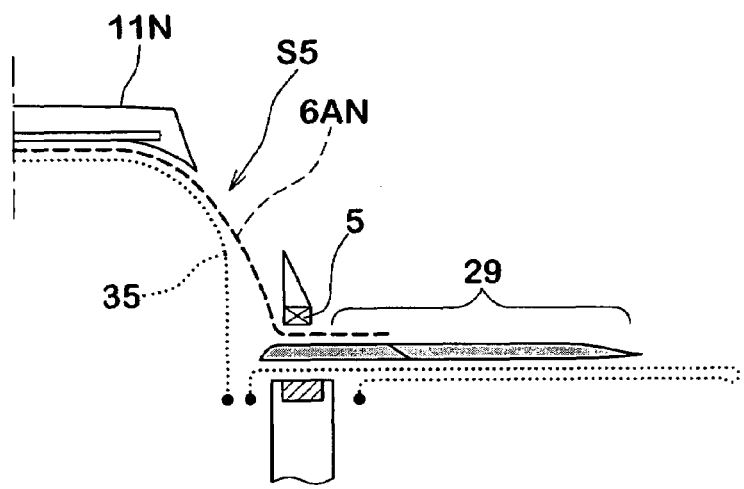
Figure 5C:
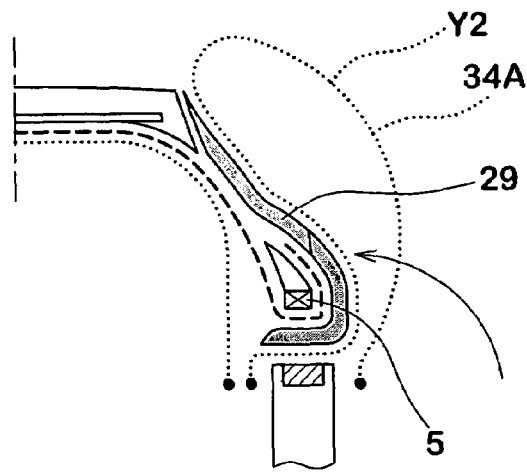

In this case, after the steps S1 and S2, as briefly shown in FIGS. 5A to 5C, the following steps are sequentially executed:

(3) a step S3 of winding a raw carcass ply 6AN between the raw clinch rubbers 21N and 21N at one circle while bridging the raw carcass ply 6AN; (In the present embodiment, a laminated sheet obtained by laminating a raw inner liner rubber on an inner surface is used as the raw carcass ply 6AN. However, the raw inner liner rubber may be wound at one circle prior to the raw carcass ply 6AN, or one layer of raw carcass ply 6AN having a topping rubber providing with a function of the inner liner rubber may be wound at one circle)

(4) a step S4 of setting the bead core 5 on the overlapping portion between the raw clinch rubber 21N and the raw carcass ply 6AN;

(5) a step S5 of inflating the raw carcass ply 6AN in a toroidal shape in the bead cores 5 and 5 together with approximating between the bead cores 5 and 5, whereby the raw carcass ply 6AN and the tread ring 11N are integrally connected by being pressed to the inner peripheral surface of the tread ring 11N which is independently formed and is previously arranged, due to the inflation;

(6) a step S6 of forming the side wall portion by winding up, around the bead core 5, the protruding portion 29 of the raw clinch rubber 21N and the raw side wall rubber 20N which protrudes to the outer side in the former axial direction from the bead core 5, and pressing and sticking to the side surface of the toroid-shaped raw carcass ply 6AN. Accordingly, the raw tire is formed.

In this case, a so-called single stage forming former is used as the former 30. This former has a structure in which a pair of slide tubes 31 which can relatively move so as to move close to and apart from in the former axial direction are provided with a bead lock means 33 supporting the bead core 5, and a side wall wind-up means 34 winding up the protruding portion 29 to an outer side in a radial direction.

In this case, the bead lock means 33 is provided with a ring-shaped bead receiving metal fitting 33A in which a diameter can be increased and reduced, and can fit and hold the bead core 5 by an outer peripheral surface thereof on the basis of a diameter increase. Further, the side wall wind-up means 34 is constituted by a bladder 34A which can be inflated by filling an air or the like. And in the present embodiment, an inner end thereof is fixed in an inner side in the former axial direction of the bead receiving metal fitting 33A, and an outer end thereof is fixed in an outer side in the former axial direction. Further, the bladder 34A is folded back in a cylindrical shape which is folded back at the outer side in the former axial direction, in a standard condition Y1 before the inflation. In this case, reference numeral 35 in the drawing denotes a center bladder, which is formed in a cylindrical shape in a standard condition Z1 before the inflation. And the center bladder 35 guides and supports at a time of winding the raw carcass ply 6AN at one circle in the step S3. Further, the center bladder 35 inflates together with the approach between the bead receiving metal fittings 33A and 33A, and inflates (shapes) the raw carcass ply 6AN in the toroidal shape in the steps S5 and 6.

Further, in accordance with a second aspect of the manufacturing method, the raw clinch rubber forming step S2 and the raw side wall rubber forming step S1 respectively include the following requirements as shown in FIG. 4.

In detail, in the raw clinch rubber forming step S2, the raw clinch rubber 21N is formed on the former 30, that is, on the fold-back bladder 34A. Accordingly, the raw clinch rubber strip 23N is wound toward an inner side in the former axial direction from an inner winding start position Qi of two winding start positions Qi and Qo which are apart from each other in the former axial direction.

Further, the raw side wall rubber forming step S1 is started at the same time of starting the raw clinch rubber forming step S2. Further, the raw side wall rubber strip 22N is wound toward an inner side in the former axial direction from the outer winding start position Qo. Further, the formed raw side wall rubber 20N is terminated such that an inner end portion 20Na in the former axial direction is lapped over an outer side in a radial direction of an outer end portion 21Nb in the former axial direction of the raw clinch rubber 21N.

As mentioned above, it is possible to simultaneously wind the respective rubber strips 22 and 23 from the different winding start positions Qi and Qo by setting the winding directions of the rubber strips 22 and 23 to the same direction, whereby it is possible to achieve a reduction of the winding time.

Further, the winding direction is set to a direction from the outer side to the inner side in the former axial direction. Accordingly, the winding start end portion 22b of the rubber strip 22 for the side wall is sequentially overlapped in the winding portion in a second circle, a third circle, and is pressed with respect to the bladder 34A, whereby a motion thereof is strongly constrained.

Figure 6:
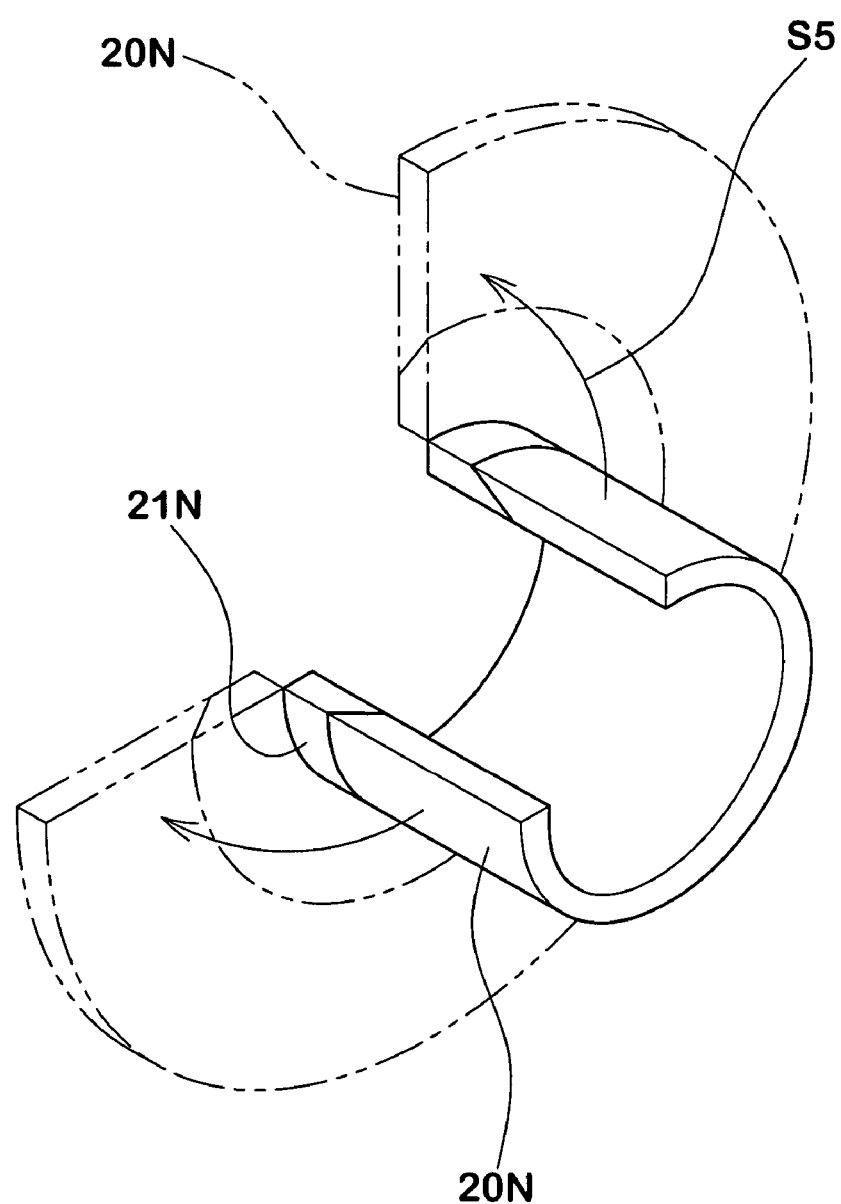
FIG. 6 is a perspective view explaining a deformation of the raw side wall rubber due to the wind-up.
Figure 7A:
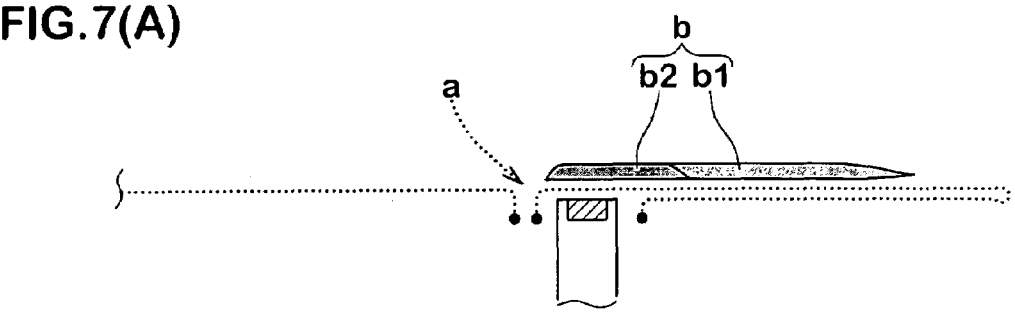
FIGS. 7(A) to 7(D) are schematically cross sectional views explaining a conventional raw tire manufacturing method.
Figure 7B:
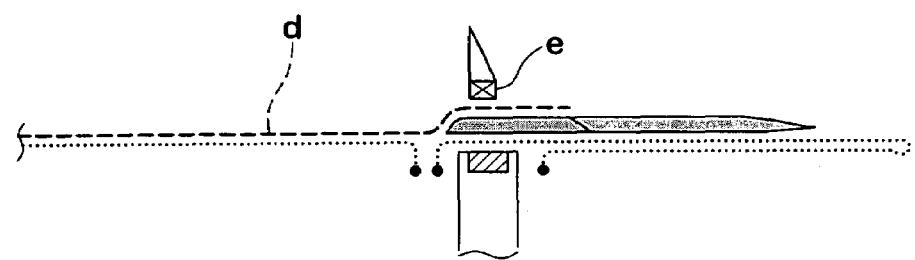
Figure 7C:
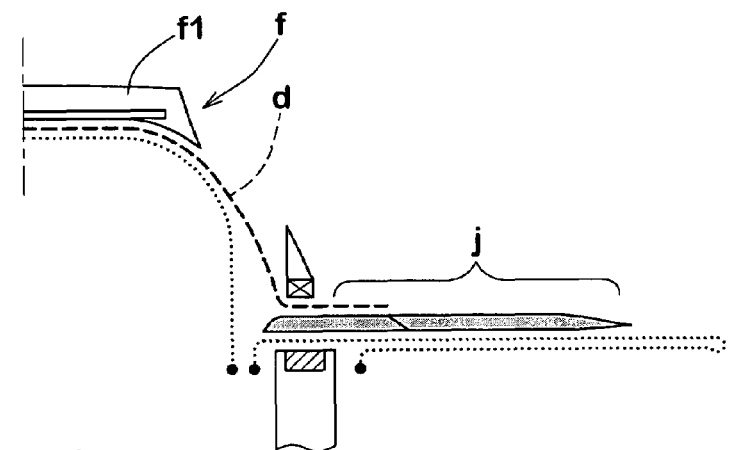
Figure 7D:
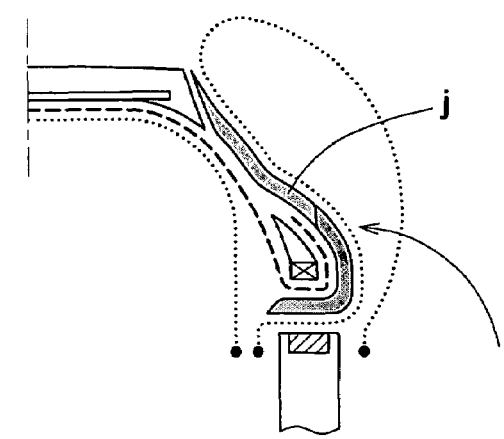

In this case, the raw side wall rubber 20N is formed in a cylindrical shape on the former 30, as conceptually shown in FIG. 6. Thereafter, the raw side wall rubber 20N is deformed in a disc shape in accordance with the wind-up step S5 by the bladder 34A, and is stuck to the side surface of the toroid-shaped raw carcass ply 6AN. At this time, in the raw side wall rubber 20N, a strong tensile force in a circumferential direction acts at an outer end side in the former axial direction in the cylindrical shape (an outer end side in the radial direction in the disc shape). Accordingly, a displacement is usually caused in the end portion of the rubber strip 22 positioned in the outer end side, and the turbulence of winding in the rubber strip tends to be generated.

However, in the present invention, the winding direction of the rubber strip 22 is specified to the direction from the outer side to the inner side in the former axial direction. In this case, as mentioned above, the motion of the start end portion 22b of the rubber strip 22 positioned in the outer end side is pressed between the winding portion after the second circle and the bladder 34A so as to be strongly constrained. As a result, the turbulence of winding in the rubber strip is restricted at a time of winding up. It is possible to improve an outer appearance quality of the tire and it is possible to improve uniformity.

As mentioned above, in the case that the raw clinch rubber 21N and the raw side wall rubber 20N, the winding direction of whose rubber strips is the direction from the outer side to the inner side in the former axial direction, are folded back to the side surface, the direction of the overlap due to the winding appears toward the tread portion 2 side from the bead portion 4 side. Accordingly, in the tire manufactured in accordance with the present manufacturing method, the rubber strip winding direction in the side wall rubber 20 and the clinch rubber 21 has a feature that the rubber strip winding direction is a direction from the bead portion 4 side to the tread portion 2 side.

Further, a border line KN of an overlapping portion R (shown in FIG. 4) of the inner end portion 20Na of the raw side wall rubber 20N and the outer end portion 21Nb of the raw clinch rubber 21N appears as an incline to an outer side in the radial direction toward the outer side in the tire axial direction, in the wound-up state, that is, a tire state.

Next, in the present embodiment, prior to the step S3 mentioned above, there is provided the step S6 (shown in FIG. 4) of forming the raw inner clinch rubber layer 26N on the raw clinch rubber 21N. In this step S6, in the present embodiment, the raw inner clinch rubber layer 26N is formed by using the rubber strip for the raw inner clinch and winding the rubber strip so as to overlap in the circumferential direction and spirally on the raw clinch rubber 21N. The winding direction of the rubber strip at this time is not particularly regulated. In this case, the raw inner clinch rubber layer 26N may be formed by winding a wide raw band-shaped rubber body at one circle.

As mentioned above, the present invention can simultaneously wind the respective rubber strips, and can achieve a reduction of winding time and improve a production efficiency. Further, it is possible to inhibit the turbulence of the rubber strip at a time of winding up the protruding portion so as to form the side wall portion, and it is possible to improve an outer appearance quality of the tire.

The description is in detail given above of the particularly preferable embodiment in accordance with the present invention, however, the present invention can be modified to various aspects without being limited to the illustrated embodiment.

What is claimed is:
1. A pneumatic tire comprising:
a tread portion,
a pair of sidewall portions,
a pair of bead portions each with a bead core therein,
a carcass ply extending between the bead portions through the tread portion and sidewall portions and turned up around the bead core in each said bead portion so as to form a pair of turnup portions and a main portion therebetween, a sidewall rubber disposed in each said sidewall portion, a clinch rubber disposed in each said bead portion and being harder than the sidewall rubber, an inner clinch rubber layer disposed in each said bead portion on the axially inside of said clinch rubber and axially outside the carcass ply turnup portion, and a bead apex rubber disposed in each said bead portion on the radially outside of the bead core, wherein the bead apex rubber extends radially outwardly beyond the radially outer end of the carcass ply turnup portion, the inner clinch rubber layer extends radially outwardly beyond the radially outer end of the carcass ply turnup portion, the clinch rubber extends radially outwardly beyond the radially outer end of the inner clinch rubber layer, a radially outer end portion of the clinch rubber is spliced with a radially inner end portion of said sidewall rubber so that the border therebetween extends axially outwardly from the axially outer surface of the bead apex rubber, while inclining radially outwardly towards the axially outside of the tire, the clinch rubber extends from the spliced radially outer end thereof to the toe of the bead portion so as to form the axially outer surface and the bottom surface of the bead portion, the sidewall rubber extends from the spliced radially inner end thereof towards the tread edge so as to form the axially outer surface of the sidewall portion, said sidewall rubber is made up of multiple windings of a first rubber strip, wherein said multiple windings progress in a single direction from the bead portion side toward the tread portion side, while each of the windings overlaps the axially outside of the axially adjacent winding, and said clinch rubber is made up of multiple windings of a second rubber strip, wherein said multiple windings progress in a single direction from the bead portion side toward the tread portion side, while each of the windings overlaps the axially outside of the axially adjacent winding, the clinch rubber has a durometer A hardness $Hs1$ in a range between 70 and 79 degrees, the inner clinch rubber layer has a durometer A hardness $Hs2$ larger than a durometer A hardness $Hs3$ of the sidewall rubber, and the hardness $Hs2$ of the inner clinch rubber layer is smaller than the hardness $Hs1$ of the clinch rubber such that the difference $(Hs1-Hs2)$ of the hardness $Hs1$ of the clinch rubber from the hardness $Hs2$ of the inner clinch rubber layer is between 10 and 20 degrees.

2. The tire according to claim 1, wherein said inner clinch rubber layer is made up of multiple windings of a third rubber strip.

3. A method for manufacturing a pneumatic tire comprising:

forming a sidewall rubber in a raw state by overlap winding a first rubber strip in a raw state on an inflatable bladder contracted around a former, starting from a first position on the bladder, toward the axially inside of the former, forming a clinch rubber in a raw state by overlap winding a second rubber strip in a raw state on the bladder contracted around the former, starting from a second position on the bladder, toward the axially inside of the former, wherein the second position is axially inside of the first position; and connecting the clinch rubber in the raw state and the raw sidewall rubber in the raw state by continuing said overlap winding of said first rubber strip in the raw state until the first rubber strip in the raw state is wound on the axially outer end portion of the clinch rubber wound on the bladder contracted around the former;

winding a carcass ply in a raw state around the former so that each of edge portions thereof is positioned radially outside the clinch rubber formed;

placing a bead core around each said edge portion of the carcass ply wound;

swelling a main portion of the carcass ply between the bead cores into a toroidal shape; and inflating said bladder so as to fold back said edge portion of the carcass ply around the bead core together with said clinch rubber and sidewall rubber wound on the bladder and so as to apply these onto the carcass ply main potion swelled, forming a pneumatic tire which comprises a tread portion, a pair of sidewall portions, a pair of bead portions each with the bead core therein, the carcass ply extending between the bead portions through the tread portion and sidewall portions and turned up around the bead core in each said bead portion so as to form a pair of turnup portions and the main portion therebetween, the sidewall rubber disposed in each said sidewall portion, the clinch rubber disposed in each said bead portion and being harder than the sidewall rubber, an inner clinch rubber layer disposed in each said bead portion on the axially inside of said clinch rubber and axially outside the carcass ply turnup portion, and a bead apex rubber disposed in each said bead portion on the radially outside of the bead core, wherein the bead apex rubber extends radially outwardly beyond the radially outer end of the carcass ply turnup portion, the inner clinch rubber layer extends radially outwardly beyond the radially outer end of the carcass ply turnup portion, the clinch rubber extends radially outwardly beyond the radially outer end of the inner clinch rubber layer, a radially outer end portion of the clinch rubber is spliced with a radially inner end portion of said sidewall rubber so that the border therebetween extends axially outwardly from the axially outer surface of the bead apex rubber, while inclining radially outwardly towards the axially outside of the tire, the clinch rubber extends from the spliced radially outer end thereof to the toe of the bead portion so as to form the axially outer surface and the bottom surface of the bead portion, the sidewall rubber extends from the spliced radially inner end thereof towards the tread edge so as to form the axially outer surface of the sidewall portion, said sidewall rubber is made up of multiple windings of the first rubber strip, wherein said multiple windings progress in a single direction from the bead portion side toward the tread portion side, while each of the windings overlaps the axially outside of the axially adjacent winding, and said clinch rubber is made up of multiple windings of the second rubber strip, wherein said multiple windings progress in a single direction from the bead portion side toward the tread portion side, while each of the windings overlaps the axially outside of the axially adjacent winding, the clinch rubber has a durometer A hardness $Hs1$ in a range between 70 and 79 degrees, the inner clinch rubber layer has a durometer A hardness $Hs2$ larger than a durometer A hardness $Hs3$ of the sidewall rubber, and the hardness $Hs2$ of the inner clinch rubber layer is smaller than the hardness $Hs1$ of the clinch rubber such that the difference $(Hs1-Hs2)$ of the hardness $Hs1$ of the clinch rubber from the hardness $Hs2$ of the inner clinch rubber layer is between 10 and 20 degrees.

* * * * *

UNITED STATES PATENT AND TRADEMARK OFFICE
CERTIFICATE OF CORRECTION

PATENT NO. : 7,628,190 B2
APPLICATION NO. : 11/223104
DATED : December 8, 2009
INVENTOR(S) : Takahashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 418 days.

Signed and Sealed this

Second Day of November, 2010

David J. Kappos
*Director of the United States Patent and Trademark Office*